United States Patent [19]

Miura et al.

[11] Patent Number: 4,890,706

[45] Date of Patent: Jan. 2, 1990

[54] UNBALANCE CORRECTION MECHANSM IN A LOCK-UP DAMPER

[75] Inventors: Hideki Miura, Hirakata; Mamoru Ookubo, Neyagawa, both of Japan

[73] Assignee: Kabushiki Kaisha Daikin Seisakusho, Osaka, Japan

[21] Appl. No.: 217,920

[22] PCT Filed: Nov. 20, 1987

[86] PCT No.: PCT/JP87/00904
§ 371 Date: Jun. 2, 1988
§ 102(e) Date: Jun. 2, 1988

[87] PCT Pub. No.: WO88/04000
PCT Pub. Date: Jun. 2, 1988

[30] Foreign Application Priority Data

Nov. 21, 1986 [JP] Japan ............................ 61-179549[U]

[51] Int. Cl.$^4$ .......................... F16D 39/00; F16D 3/50
[52] U.S. Cl. ................................... 192/3.28; 192/3.29; 192/3.3
[58] Field of Search ........................ 192/3.28, 3.29, 3.3

[56] References Cited

U.S. PATENT DOCUMENTS

| 4,512,449 | 4/1985 | Motomura et al. | 192/3.28 |
| 4,570,764 | 2/1986 | Nishimura | 192/3.29 |
| 4,646,886 | 3/1987 | Nishimura | 192/3.28 |

FOREIGN PATENT DOCUMENTS

| 0200853 | 11/1983 | Japan | 192/3.29 |
| 0062765 | 4/1984 | Japan | 192/3.29 |
| 61-28126 | 8/1986 | Japan. | |
| 2123906 | 2/1984 | United Kingdom | 192/3.29 |

Primary Examiner—Leslie A. Braun
Assistant Examiner—Andrea Pitts
Attorney, Agent, or Firm—Armstrong, Nikaido, Marmelstein, Kobovcik & Murray

[57] ABSTRACT

A drive ring (13) is fixed to a clutch plate (11) of a lock-up clutch. The ring (13) is provided with rims (13a) and support walls (17), which radially hold damper springs (15 and 16), as well as spring receiver projections (21A and 21B) and claws (23) aligned to each other. A spring seat (24), which have legs (24a) fitted into the damper spring, for correcting the unbalance is attached at each end of the damper spring.

3 Claims, 8 Drawing Sheets

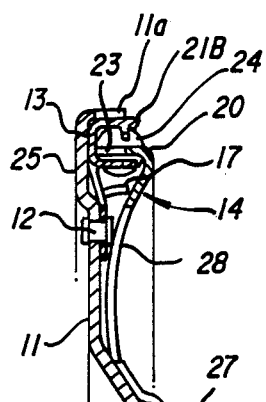
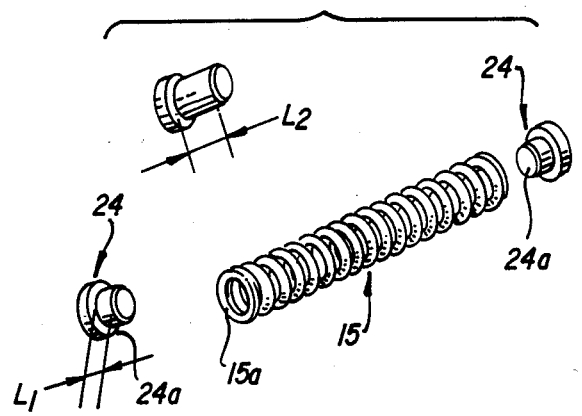
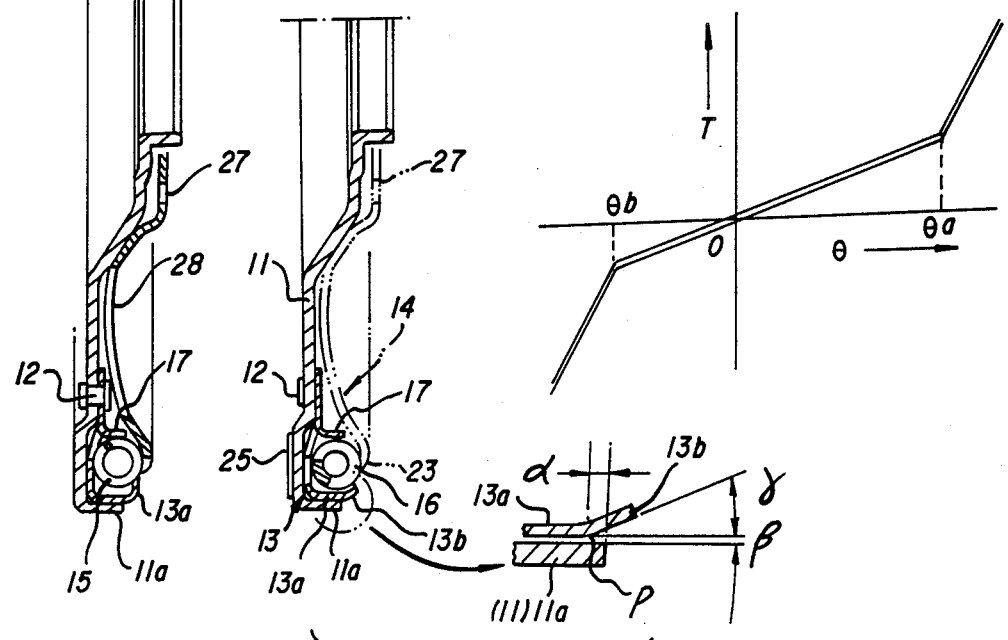

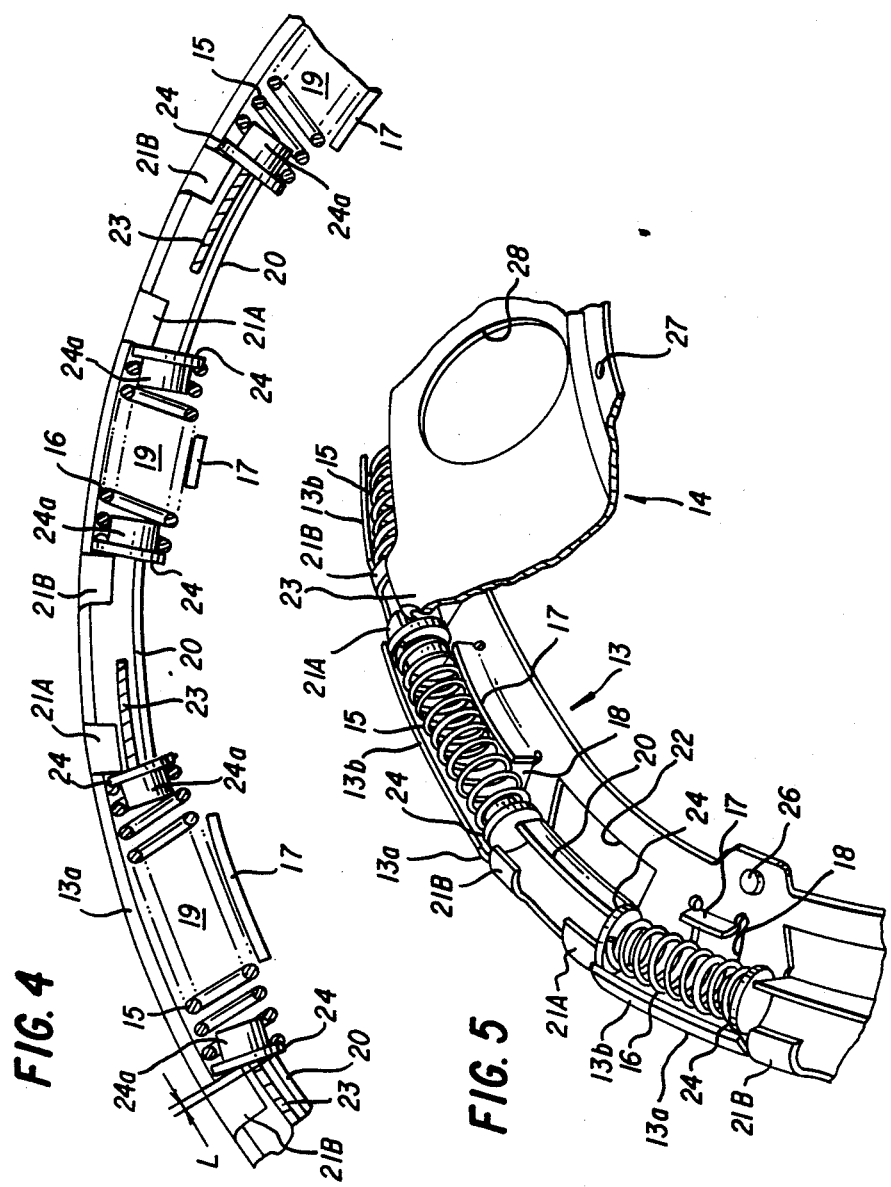

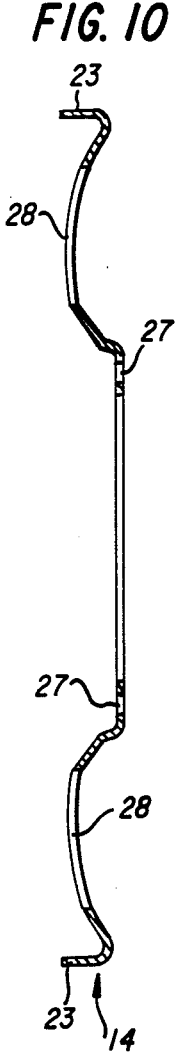
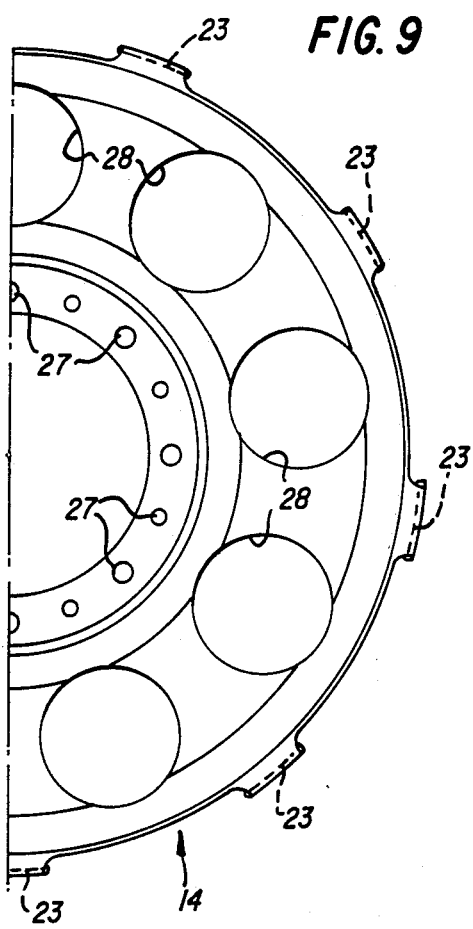
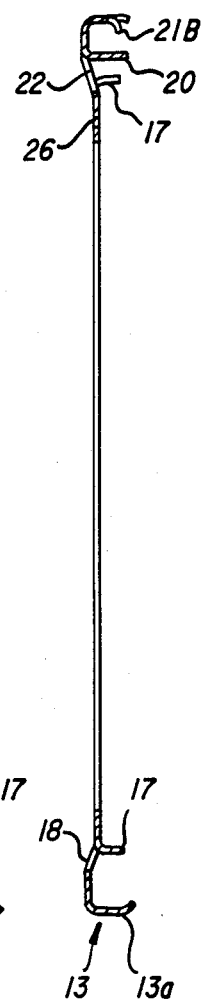
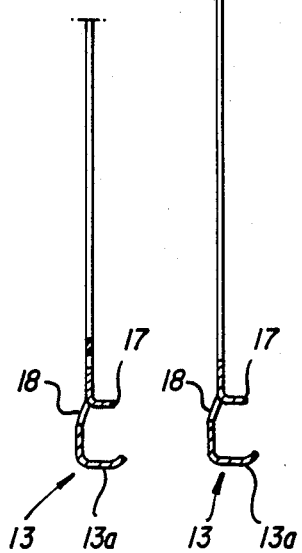
FIG. 10
FIG. 9
FIG. 7
FIG. 8

UNBALANCE CORRECTION MECHANSM IN A LOCK-UP DAMPER

DESCRIPTION

1. TECHNICAL FIELD

The present invention relates to an unbalance correction mechanism in a lock-up clutch of a torque converter which selectively put the torque converter in an inactive (lock-up) condition and an active condition.

BACKGROUND ART

FIGS. 14 and 15 illustrate principal parts of the U.S. Pat. No. 4,240,532. In FIG. 14, a lock-up damper of 100 is disposed between a front cover 102 and turbine 107 of a torque converter. Front cover 102 is welded at a portion 104 to a pump 103 and is connected at an outer peripheral coupling 106 to an input shaft 114. Turbine 107 is connected by rivets 110 to a hub 109 splined onto an output shaft 115. Stator 108 has an one-way clutch 111, of which inner race 112 is splined to a stationary cylindrical shaft 116. The lock-up damper 100 comprises a piston, or clutch plate, axially slidably supported on the hub 109, a drive ring 118 welded to a rear surface (right side surface) of the outer peripheral portion of the clutch plate 117, circumferentially extending damper springs 120 disposed in pockets 119 in the drive ring 118, and a driven ring 122 which have claws 121 engaging with the damper springs 120 and is fixed to the turbine 107. A friction facing 123 is fixed to a front surface of the outer peripheral portion of the clutch plate 117. When the facing 123 on the clutch plate 117 is pressed onto the front cover 102 by a difference between pressures at the opposite sides of the clutch plate 117, the front cover 102 is directly connected or locked up to the turbine 107 through the damper springs 120 in the lock-up damper 100.

The drive ring 118 in FIG. 15 has outer rims 125 and support walls 126 for forming the spring pockets 119, as shown in FIG. 15, as well as projections 127 and 128 which form spring receivers at opposite sides of the spring pockets 119, respectively. Each spring pocket 119 accommodates a set of one long damper spring 120 and one short damper spring 120a. The claws 121 are disposed between springs 120 and 120a.

In the lock-up damper including the piston assembly (clutch plate 117, drive ring 118, lock-up damper 100 and others) and the driven ring 112 which are formed as independent parts from each other as shown in FIGS. 14 and 15, unbalance is corrected by welding a balance piece to a radially middle portion of the piston 117, e.g., by spot welding or projection welding, or by punching out by a press machine a region, e.g., of a half-circular shape, which corresponds to an unbalance amount, at a cylindrical extention formed at the outer peripheral portion of the piston 117.

However, in the welding, (1) the balance piece may drop and close a hydraulic circuit during the driving. (2) It is laborious to remove spatters or the like produced by the welding. (3) The piston (clutch plate 117) may be deformed by the welding, which may cause nonuniform contact of the lock-up facing 123, resulting in disadvantages such as wear and heat damage.

In the press punching at the outer peripheral portion of the piston, it is necessary to provide at the radially outer portion of the piston with an extension (extra flange) which axially projects beyond the portion necessary for supporting the damper springs 120, resulting in remarkable increase of the weight.

The object of the invention is to prevent the disadvantages such as dropping of the balance piece, entry of the spatters and deformation of the piston, as compared with the conventional balance piece welding method, and to reduce the weight, as compared with the conventional press punching at the radially outer portion of the piston.

DISCLOSURE OF THE INVENTION

The present invention provides an unbalance correction mechanism in a lock-up damper, wherein a turbine in a main part of a torque converter is disposed between a pump, which is faced to the turbine and located at one side thereof, and a front cover which is located at the other side of the turbine and connects the pump to an input shaft, and is connected to an output shaft, a clutch plate frictionally engageable with the front cover is axially movably disposed between the turbine and the front cover, and the clutch plate and the turbine are relatively rotatably connected to each other by circumferentially long damper springs; characterized in that, the clutch plate is provided at the side surface faced to the turbine with rims and support walls, which hold the radially outer and inner sides of the damper springs, as well as spring receivers disposed between the adjacent damper springs for receiving the end surfaces of the damper springs, claws extending from a driven ring at the turbine side and disposed adjacent the spring receivers so that the claws may face to the end surfaces of the damper springs, and spring seats, which have legs fitted into the damper springs for correcting the unbalance and are attached at the ends of each damper spring.

BRIEF DESCRIPTION OF THE DRAWINGS

FIG. 2 is a longitudinally sectional side view taken along the line II—II in FIG. 1;

FIG. 3 is a longitudinally sectional side view taken along the line III—III in FIG. 1;

FIG. 4 is a fragmentary rear view of a drive ring;

FIG. 5 is a perspective view of the drive ring of FIG. 4;

FIG. 7 is a sectional view taken along the line VII—VII in FIG. 6;

FIG. 8 is a sectional view taken along the line VIII—VIII in FIG. 6;

FIG. 9 is a fragmentary rear view of the driven ring;

FIG. 10 is a longitudinally sectional side view of the driven ring of FIG. 9;

FIG. 11 is a perspective view illustrating a damper spring and a spring seat;

FIG. 13 is a graph illustrating an operation;

BEST MODE FOR CARRYING OUT THE INVENTION

Figure 1:
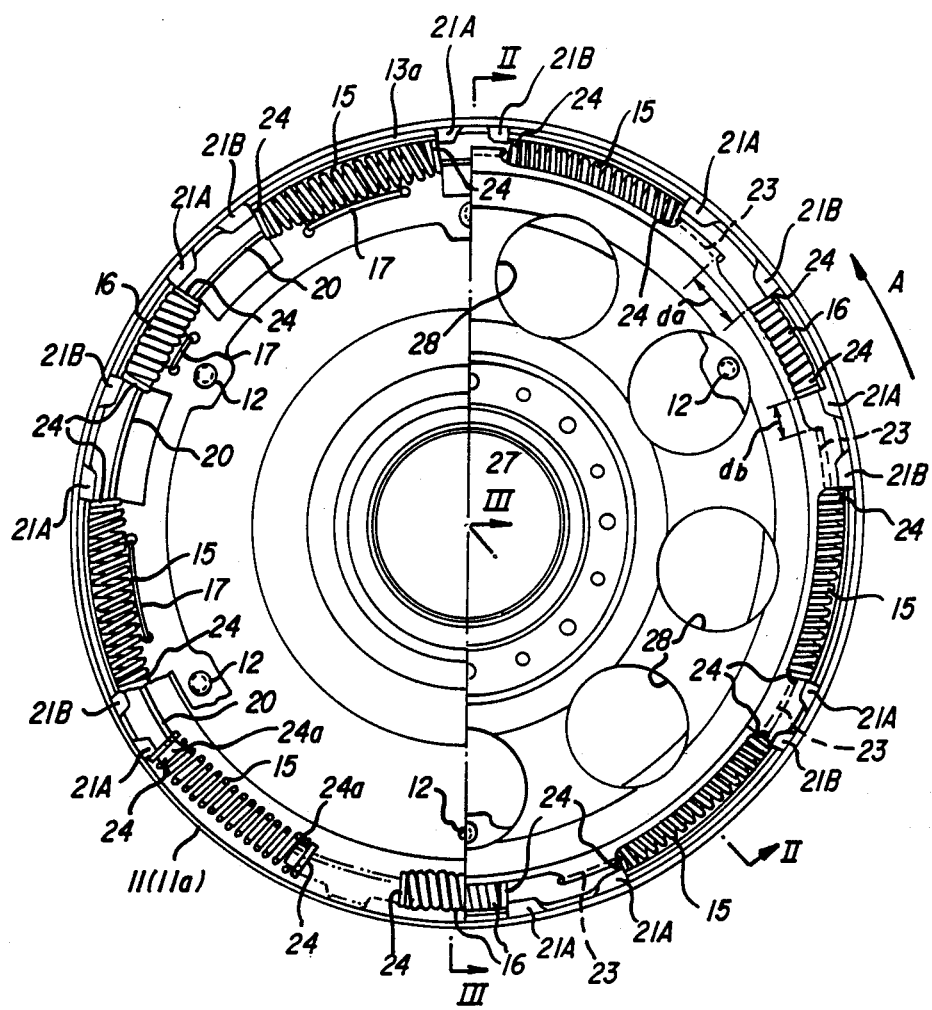
FIG. 1 is a partially cut-away rear view of a lock-up clutch according to the instant invention with a half of a driven ring removed.

Referring to FIGS. 1-5, a lock-up damper device according to the invention comprises a drive ring 13 (plate) made of sheet metal which is fixed by rivets 12 to a piston 11 (clutch plate), a driven ring 14 (plate) fixed by rivets (not shown) to a turbine (not shown) of a torque converter, and two kinds of damper springs 15 and 16 disposed between rings 13 and 14 and at radially outer portion of the rings.

The drive ring 13 includes outer peripheral rims 13a which extend along inner surfaces of rims 11a at the outer periphery of the piston 11 and have a height, in an axial direction of the damper, slightly larger than that of the rims 11a of the piston 11. The drive ring 13 includes a plurality of circumferentially spaced support walls 17 which radially outwardly face to the rims 13a. Each support wall 17 is integrally formed by a portion of the drive ring 13 which is partially cut and radially bent, so that an opening 18 having a shape corresponding to the support wall 17 is formed at radially outside the support wall 17. Each of the damper springs 15 and 16 which extend in the circumferential direction are disposed in spring pockets 19 formed between the outer rims 13a and the support walls 17 which are slightly lower that the rims 13, respectively, and are prevented from dropping or disengaging in the radially outward and inward direction. The leading end of each outer rim 13a is radially inwardly bent to form a stopper 13b. That is; as apparent from an enlarged view associated to FIG. 3, each stopper 13b is fitted into the outer rim 11a of the piston 11 with a slight space therebetween. Each stopper 13b is inclined radially inwardly at an angle of $\gamma$, and has a base end portion having an axial length of $\alpha$ which is overlapped with the end portion of the outer rim 11a. Thus, the partially tapered stopper 13b continues to the partially cylindrical outer rim 13a to form a threedimension structure. The stoppers 13b extend along the configurations of the damper springs 16 and 15 disposed radially inside the stopper 13b, so that the stoppers 13b, which receive the centrifugal force from the damper springs 16 and 15 when they are deflected radially outwardly by the centrifugal force, contact the inner surface of the piston rims 11a while the contact points gradually moving in the axially outward direction (rightward in FIG. 3), which achieves a damping or shock absorbing effect. Each rim 11a in FIG. 3 protrudes a distance of $\alpha$ beyond a boundary P between the outer rim 13a and the stopper 13b of the drive ring 13. This distance $\alpha$ between the leading end of the rim 11a and the boundary P is preferrably at least 0 even when the tolerance is of the largest value. The distance of the space $\beta$ is in a predetermined range (e.g., 0.5 mm), in which the elastic deformation is allowed and development of cracks is prevented at the rims 13a of the drive ring 13. That is; it has been found that the destruction of the drive rim 13 by the centrifugal force of the springs is caused by the phenomenon that the cylindrical outer rims 13a elastically deform and the cracks develop at the base end portions of cut and bent spring receiver projections 21B adjacent to the rims 13a. Thus, the rotational strength can be improved by restricting the deformation of the portions at the boundaries P. Namely, as shown in FIG. 3, the countermeasures can be performed by extending the outer rims 11a of the clutch plate 11 beyond the boundaries P. It is necessary, as described above, that the dimension $\beta$ is set in the range in which the elastical deformation is allowed and the development of cracks does not start.

The drive ring 13 also includes circumferentially spaced projected walls 20 which are located adjacent to and radially outside the support walls 17 and a plurality of pairs of projections 21A and 21B which are circumferentially spaced to each other and are radially faced to the outer surface of the walls 20, respectively. These walls 20 and projections 21A and 21B are located at side-by-side relationship with respect to the spring pockets 19. The projected walls 20 are integral with the drive ring 13 and are formed by portions of the ring 13 which are partially cut and radially outwardly bent through about 90 degrees, so that corresponding openings 22 are formed radially inside the projected walls 20, respectively. Each pair of the projections 21A and 21B are integral with the drive ring 13 and are formed by portions of the ring 13 between the outer rims 13a, which are partially cut and radially outwardly bent. A recess is formed between the projections 21A and 21B at each pair.

The driven ring 14 is integrally provided at the outer periphery with circumferentially equally spaced claws or projections 23 projecting toward the drive ring 13. Each claw 23 is so located that it may enter between the projected wall 20 and the projections 21A and 21B of the drive ring 13, as viewed in the radial direction of the damper. The springs 15 and 16 consists of coil springs. The longer springs 15 are circumferentially adjacent two by two, and each shorter spring 16 is disposed between spring pairs, each of which includes the two springs 15. The springs 15 and 16 fittedly hold spring seats 24 at the opposite ends thereof. Each spring seat 24 has a leg 24a fitted into each end of the spring. As shown in FIG. 11, each end surface 15a of the spring is polished so that it may closely contact the spring seat 24. Several kinds (e.g., five kinds) of the spring seats 24 having heads of same sizes and legs 24a of different lengths are prepared before assembling. The spring seat 24 is replaced by that having the long or short leg 24a in accordance with the amount of the unbalance, so that the unbalance can be corrected.

Among the spring pockets 19 formed in the drive ring 13, those for the long springs 15 are circumferentially long and the other for the short springs 16 are short. The projected walls 20 and the projections 21A and 21B of the drive ring 13 are arranged as follows.

When the springs 15 and 16 equipped with the spring seats 24 are fitted in the spring pockets 19 in the drive ring 13, the springs 15 and 16 are slightly compressed, as shown in a left portion in FIG. 1, and the spring seats 24 contact the projected walls 20 and the projections 21A or 21B. When the driven ring 14 is assembled to the drive ring 13 after the assembly of the springs 15 and 16 and the springs seats 24 to the drive ring 13 described above, as shown in a right portion in FIG. 1, the spring seats 24 for the long springs 15 contact the claws 23 of the driven ring 14 without a space. However, each spring seat 24 at one end of each short spring 16 is located apart from the claw 23 of the driven ring 14 with a circumferential space da therebetween, and each spring seat 24 at the other end of the spring 16 is located apart from the claw 23 with a space db therebetween. The projected walls 20 and the projections 21A and 21B are formed in the drive ring 13 so that the springs and other members may keep the relationship described above. The spaces da in the positive rotation direction indicated at an arrow A in FIG. 1 is determined to be longer than the spaces db in the reverse direction.

As shown in FIG. 4, the projected walls 20 are circumferentially retracted with respect to the projections 21A and 21B so that the damper springs may form nearly linear shapes rather than a shape curved in the circumferential direction of the disk, when the disk stops or rotates at a low speed. Whereby, at the high speed driving, the damper springs 15 are cured radially outwardly, so that each spring seat 24 moves away from the projected wall 20 to form a space L between the seat 24 and the drive ring claw 23, and thus, the piston 11 including the drive ring can axially smoothly move with respect to the claws 23, resulting in smooth engagement and disengagement operation of the clutch.

Figure 6:
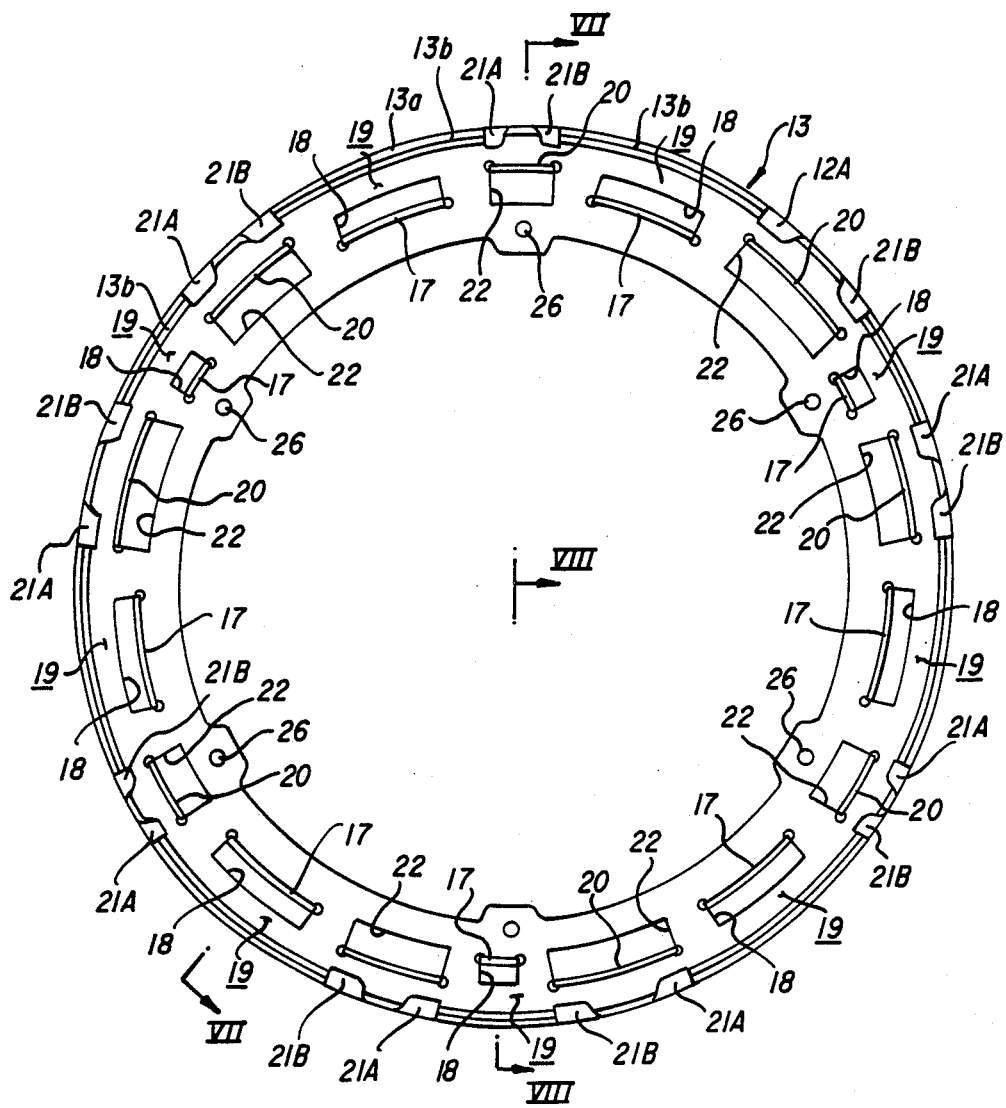
FIG. 6 is a rear view of the drive ring alone.
Figure 12:
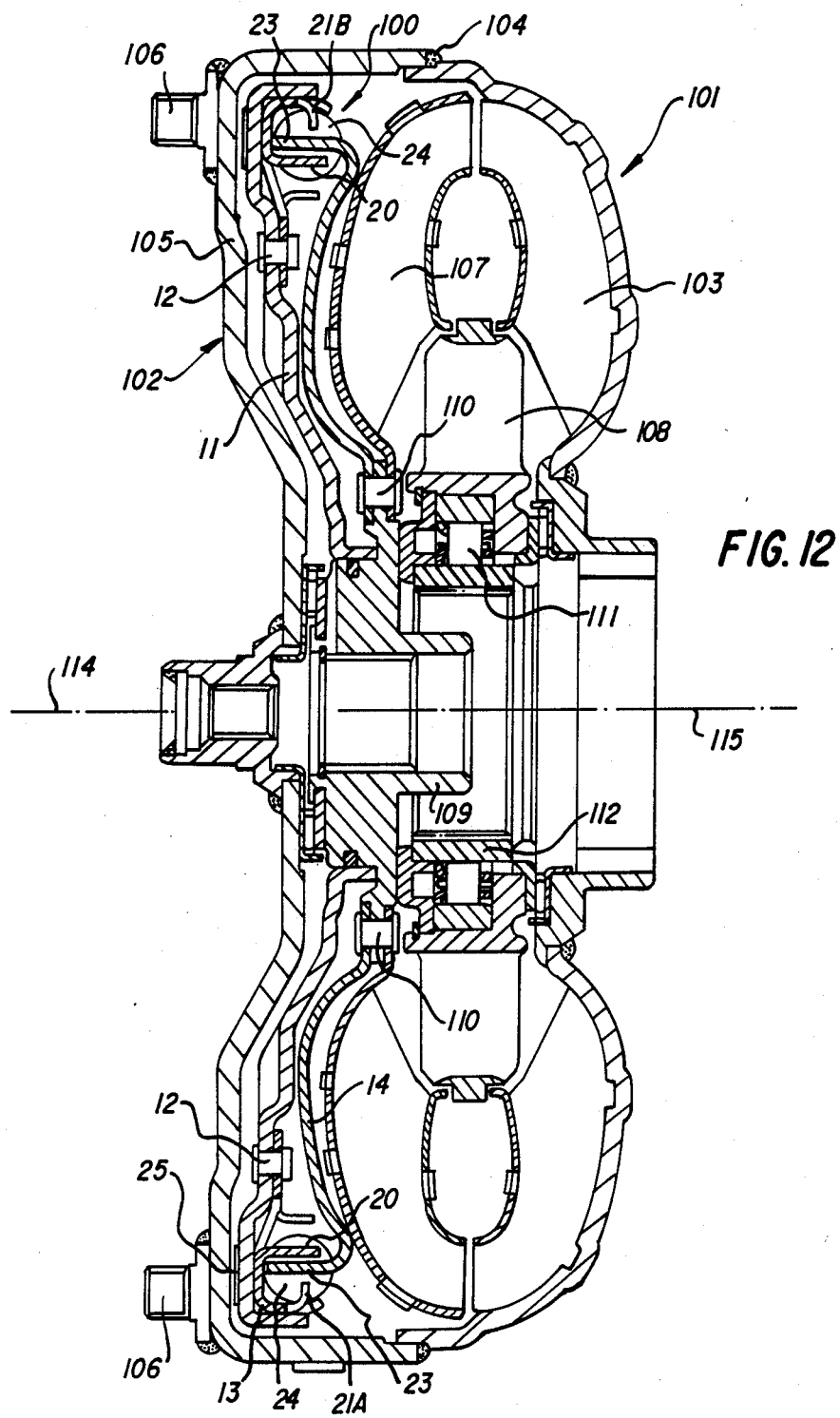
FIG. 12 is a longitudinal sectional view of a torque converter incorporating the device according to the invention.
Figure 14:
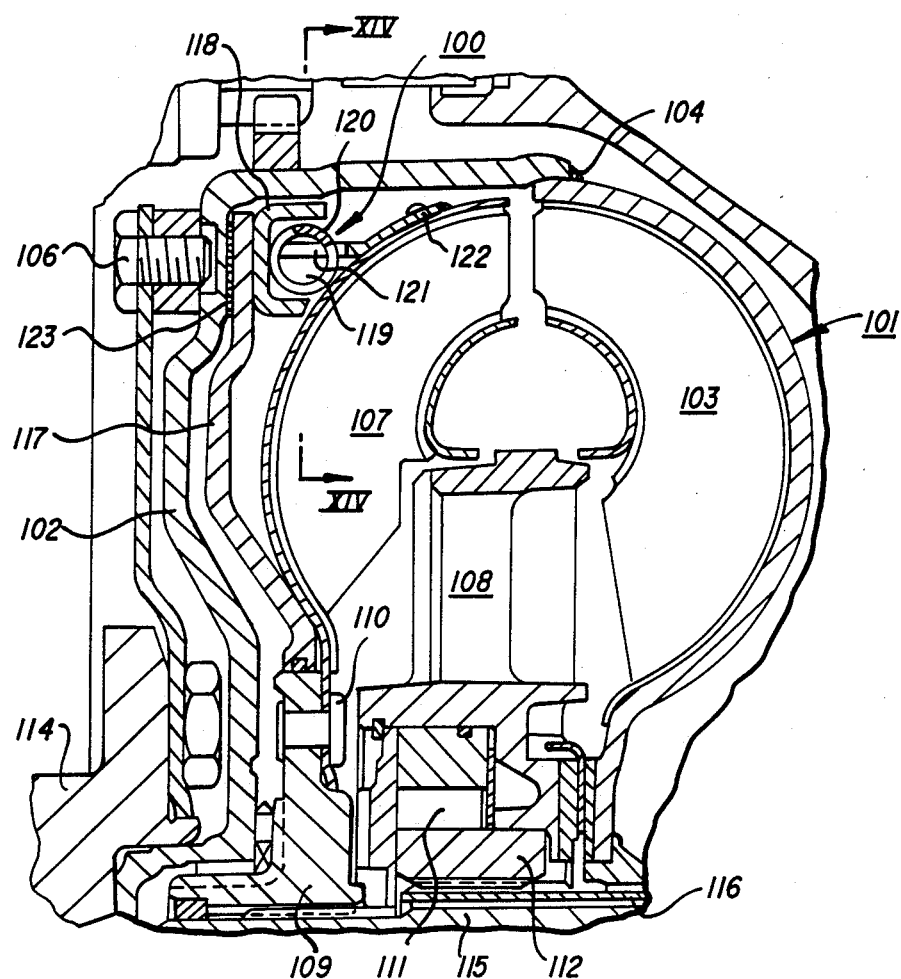
FIG. 14 is a fragmentary and longitudinally sectional view illustrating a prior art.
Figure 15:
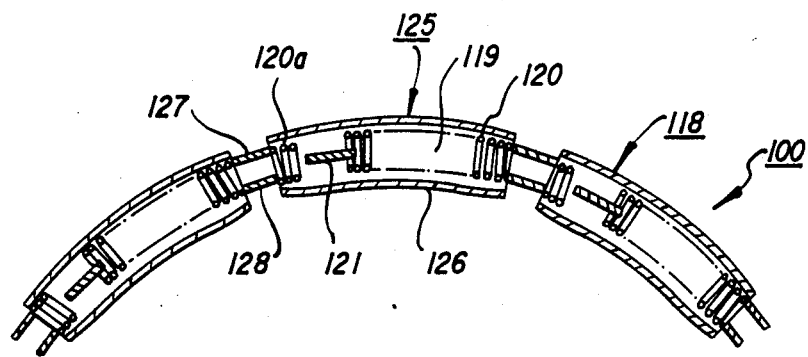
FIG. 15 is a fragmentary sectional view taken along the line XV—XV in FIG. 14.

As shown in FIGS. 2 and 3, a facing 25 is fixed to the whole surface of the outer peripheral portion of the piston. Apertures 26 formed in the drive ring 13 for said rivets 12 are formed at convex portions which are circumferentially spaced at the inner peripheral portion of the drive ring, as shown in FIG. 6. Apertures 27 for the rivets which fix the driven ring 14 to the turbine is formed at the inner peripheral portions of the driven ring 14, as shown in FIG. 9. As shown in FIGS. 1 and 9, the driven ring 14 is provided with equally spaced circular openings 28 for reducing the weight.

When the lock-up clutch engages during the positive driving of the engine, the projected walls 20 of the drive ring 13 and the projections 21A located at the positive rotation side compress the long springs 15 in the direction of the arrow A in FIG. 1 through the spring seats 24 at the one ends of the long springs 15, respectively, so that the claws 23 of the driven ring 14 are pushed in the direction of the arrow A through the spring seats 24 at the other ends of the long springs 15, and thus, the rotation of the drive ring 13 is transmitted to the driven ring 14. After the long springs 15 are compressed for the amount corresponding to the space da in FIG. 1, the projected walls 20 and the projections 21A of the drive ring 13 engage with the spring seats 24 at the one ends of the short springs 16, so that the short springs 16 are compressed in the direction of the arrow A through the spring seats 24, and thus, the claws 23 of the driven ring 14 is pushed in the direction of the arrow A through the spring seats 24 at the other ends of the short springs 16, so that the short springs 16 also contributes to the transmission of the rotational torque. (two-stage characteristics)

When the lock-up clutch is engaged during the reverse driving of the engine, the operation is performed similarly to that described above, except for that the projections 21A located at the reverse side function as projections of the drive ring 13 which concerned in the compression of the damper springs 15 and 16, and thus, the transmission of the torque.

FIG. 13 illustrates a relationship between transmitted torsion torque and torsion angle between the drive and driven rings 13 and 14 when the device operates. Since the short springs 16 contributes to the torque transmission only after the torsion angle reaches a certain amount, as shown in FIG. 13, two-stage type or stepped characteristics can be obtained. Since the spaces da in FIG. 1 are longer than the spaces db, the torsion torque θa, at which the torsion torque starts to rapidly increase in the positive rotation direction, is larger than the absolute value of the torsion angle θb, at which the torsion torque starts to rapidly increase in the reverse direction.

In the assembling operation, the damper springs 15 and 16 equipped with the spring seats 24 at the ends thereof and fitted in the spring pockets 19 in the drive ring 13 are prevented from radially dropping by the rims 13a and the support walls 17 of the drive ring 13, and are also snapfitted between the projected walls 20 and the projections 21A or 21B of the drive ring 13, so that it is not necessary to manually set the damper springs 15 and 16 during the assembly operation of the drive ring 13 and the driven ring 14.

The piston assembly (i.e., the assembly of the clutch plate 11, the drive ring 13, the damper springs 15 and 16 and others) is set on a dynamic balancer to determine the position and amount of the unbalance, and then, the spring seat 24 at the vicinity of that position is replaced by the spring seat 24 having the leg 24a of the different length to eliminate the unbalance.

According to the structures described above, following advantages can be obtained. (1) According to the invention, since the unbalance can be corrected only by appropriately replacing and attaching the spring seat 24 having the leg 24 of the different length, it can prevent the disadvantages such as dropping of the balance piece, entry of the spatters and deformation of the piston, as compared with the conventional balance piece welding method, and it is not necessary to prepare a heavy outer peripheral portion at the piston, which effects to reduce the weight, as compared with the conventional press punching at the radially outer portion of the piston. (2) There is an advantage that the appearance does not change. (3) Since it requires only to previously prepare several kinds of the spring seats having the legs 24a of different lengths, the invention can be employed at the low cost.

INDUSTRIAL APPLICABILITY

The lock-up damper device to which the invention is applied as described hereinbefore is usefully employed in the torque converters of the automobiles and others.

What is claimed is:

1. An unbalance correction mechanism in a lock-up damper for a torque converter having a front cover, a turbine, a pump and a lock-up damper between said turbine and said front cover, said pump being connected to said cover and said cover being connected to the input shaft of said torque converter, said turbine being connected to the output shaft of said torque converter, said lock-up damper having a clutch plate axially movable and frictionally engageable with said front cover, said clutch plate and said turbine being relatively rotatably connected to each other by circumferentially spaced damper springs; characterized in that, said clutch plate is provided at the side surface facing said turbine with rims and support walls for engaging the radially outer and inner sides of said damper springs and spring receivers disposed between adjacent of said damper springs for receiving the ends of said adjacent damper springs, a driven ring fixed to said turbine and having claws disposed adjacent said spring receivers, said claws facing said ends of said adjacent damper springs, and spring seats for said damper springs, said spring seats each having a leg fitted into said ends of said adjacent of said damper springs, said leg on each said spring seat on said end of each said adjacent damper spring being of a selected length such that, when said lock-up damper is assembled, said spring seats balance said assembled lock-up damper.

2. A correction mechanism as set forth in claim 1 wherein said support walls are circumferentially retracted relative to said inner side of said damper springs so that said damper springs may form substantially linear shapes rather than radially outwardly curved shape.

3. A correction mechanism as set forth in claim 1 wherein said clutch plate includes a drive ring having an inner peripheral portion rivetted to said clutch plate.

* * * * *